(12) United States Patent  (10) Patent No.: US 6,694,084 B1
Nakamura  (45) Date of Patent: Feb. 17, 2004

(54) OPTICAL CABLE EXCESS HANDLING UNIT AND OPTICAL CABLE WIRING METHOD

(75) Inventor: Hisashi Nakamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/049,624

(22) PCT Filed: Jun. 23, 2000

(86) PCT No.: PCT/JP00/04149
§ 371 (c)(1),
(2), (4) Date: Feb. 22, 2002

(87) PCT Pub. No.: WO01/98802
PCT Pub. Date: Dec. 27, 2001

(51) Int. Cl.[7] .................................................. G02B 6/00
(52) U.S. Cl. ...................................................... 385/135
(58) Field of Search .......................................... 385/135

(56) References Cited

U.S. PATENT DOCUMENTS

| 4,765,708 A | | 8/1988 | Becker et al. | |
|---|---|---|---|---|
| 4,900,123 A | * | 2/1990 | Barlow et al. | 385/53 |
| 5,457,764 A | * | 10/1995 | Edera | 385/135 |
| 5,511,144 A | * | 4/1996 | Hawkins et al. | 385/135 |
| 5,566,269 A | * | 10/1996 | Eberle et al. | 385/137 |
| 5,577,151 A | * | 11/1996 | Hoffer | 385/135 |
| 5,613,030 A | * | 3/1997 | Hoffer et al. | 385/135 |
| 5,917,984 A | * | 6/1999 | Roseler et al. | 385/135 |
| 6,438,310 B1 | * | 8/2002 | Lance et al. | 385/135 |

FOREIGN PATENT DOCUMENTS

| JP | 5-107416 | 4/1993 |
|---|---|---|
| JP | 8-222866 | 8/1996 |
| JP | 9-105820 | 4/1997 |
| JP | 10-221533 | 8/1998 |

* cited by examiner

*Primary Examiner*—Hae Moon Hyeon
(74) *Attorney, Agent, or Firm*—Oblon, Spivak, McClelland, Maier & Neustadt, P.C.

(57) ABSTRACT

A unit for handling the remainder of optical cables includes a cable supporting section and a connector for interface arranged at a central section of the cable supporting section. The cable supporting section includes a first area for holding previously the remainder of an optical cable during in-plant fabrication of the unit and a second area for holding the remainder of the other optical cable connecting through the connector to an end of the one optical cable held on the first area during field installation of optical cables. The connector is arranged at a boundary between the first and second areas.

13 Claims, 7 Drawing Sheets

OPTICAL CABLE EXCESS HANDLING UNIT AND OPTICAL CABLE WIRING METHOD

FIELD OF THE INVENTION

The invention relates to a unit for handling the remainder of optical cables wired in a device for mounting telecommunications equipment such as transmission devices, telephone switching devices and so on and to a method for wiring the optical cables using the unit for handling the remainder thereof.

BACKGROUND ART

The conventional units for handling the remainder thereof and cable supporting sections known are disclosed in JP-A-222866/1996, for example.

Figure 1:
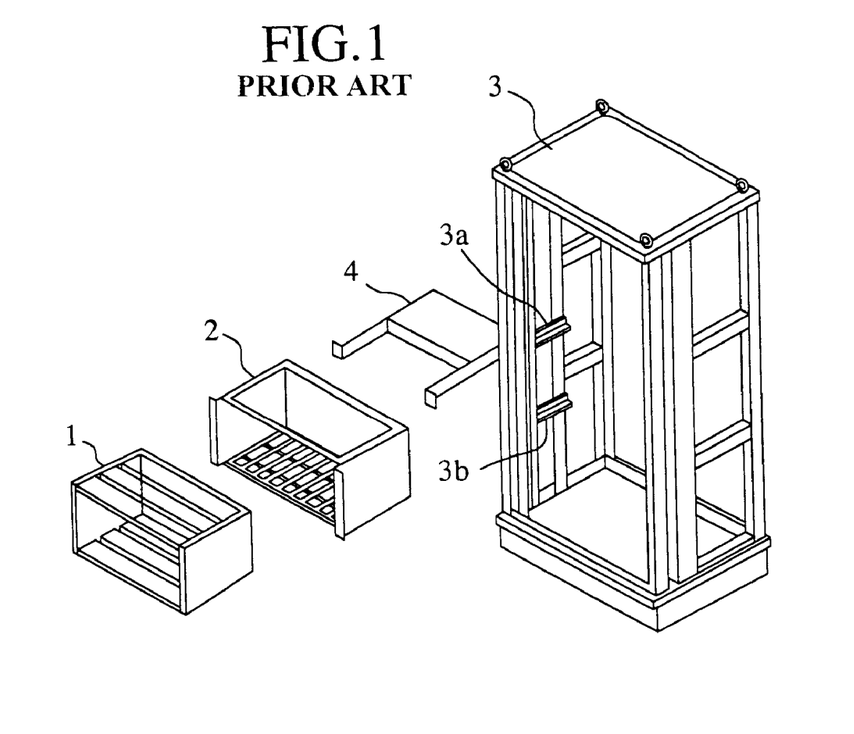
FIG. 1 is an exploded perspective view of construction of the conventional telecommunication equipment unit-mounting device.
Figure 2:
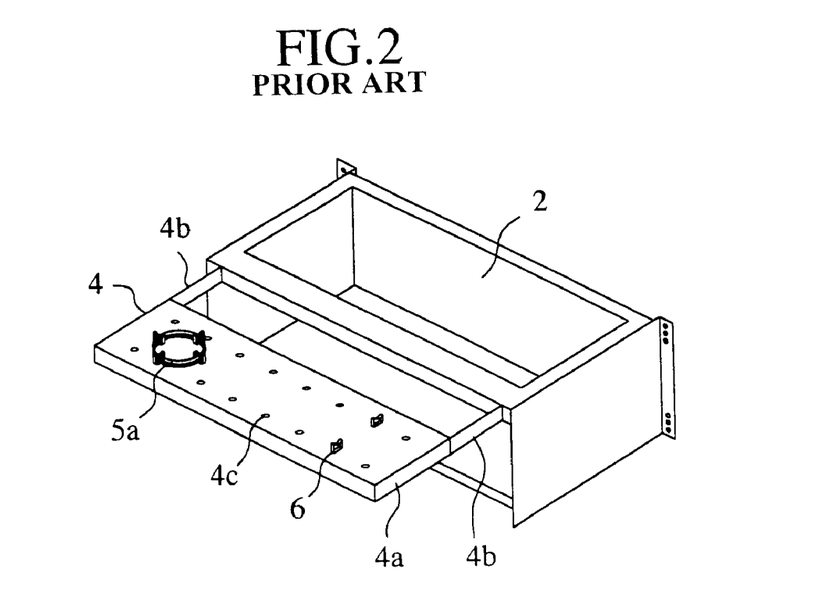
FIG. 2 is an enlarged perspective view of construction of the conventional unit for handling the remainder of optical cables, the unit being arranged in the unit-mounting device shown in FIG. 1.
Figure 3:
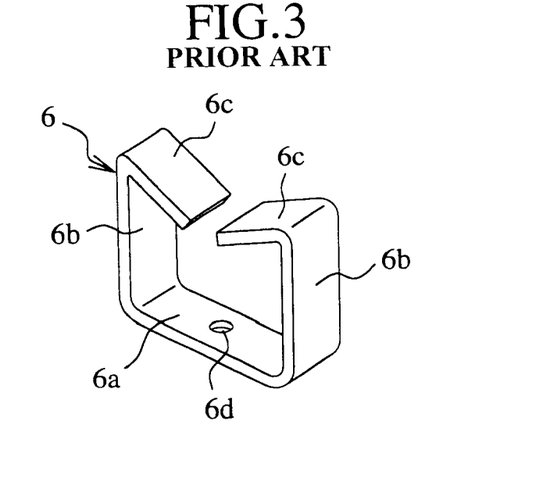
FIG. 3 is an enlarged perspective view of construction of a wire saddle, which is used in the unit shown in FIG. 2 in order to keep hold of the optical cables.

FIG. 1 is an exploded perspective view of construction of a telecommunication equipment unit-mounting device (hereafter, referred as a unit-mounting device) disclosed in the gazette above. FIG. 2 is an enlarged perspective view of construction of the conventional unit for handling the remainder of optical cables, the unit being arranged in the unit-mounting device shown in FIG. 1. FIG. 3 is an enlarged perspective view of construction of a wire saddle, which is used in the unit shown in FIG. 2 in order to keep hold of the optical cables.

In FIG. 1, a reference numeral 1 denotes a telecommunications equipment mounted unit mounting telecommunications equipment (not shown) such as transmission devices, telephone switching devices and so on, the equipment using optical cables as a means of conveying intelligence. A reference numeral 2 denotes a unit-mounting frame mounting the telecommunications equipment mounted unit 1 thereon. A reference numeral 3 denotes a box-shaped rack including an inner wall face having a mounting section 3a on which a plurality of unit-mounting frames 2 are mounted. A reference numeral 4 denotes a unit for handling the remainder of optical cables 5 used for transferring signals to the telecommunications equipment (not shown) mounted in the telecommunications equipment mounted unit 1 in order to install the optical cables 5 onto the unit 1.

As shown in FIG. 2, the unit 4 includes a rectangular, flat-shaped cable supporting section 4a for holding the loop-shaped remainder 5a of the optical cables 5 and a pair of supporting arms 4b extending from both sides of the cable supporting section 4a. Each front end of the supporting arms 4b is fixed on an upper face of one wall of the unit-mounting frames 2 to cantilever the cable supporting section 4a. Two rows of mounting holes 4c along the length of the cable supporting section 4a are formed at the cable supporting section 4a. A wire saddle 6 shown in FIG. 3 is fixed using a screw at the mounting hole 4c corresponding to a position where the remainder 5a of the optical cable 5 should be handled, of the mounting holes 4c scattered over the cable supporting section 4a. The wire saddle 6 is shaped like a letter U. The wire saddle 6 includes an approximately rectangular-shaped bottom section 6a, a pair of wall sections 6b, a pair of tilting sections 6c and a mounting hole 6d. The bottom section 6a has a flat face corresponding to the upper face of the cable supporting 4a. The wall sections 6b are so formed at both sides of the bottom section 6a as to extend upwardly from the both sides. The tilting sections 6c is formed by bending sharply upper sections of the wall sections 6b toward an upper space of the bottom section 6a. The mounting hole 6d is formed at a central section of the bottom section 6a and allows insertion of a screw (not shown) which is used for mounting the wire saddle 6 on the cable supporting section 4a through the mounting hole 4c. A gap 6e, which is defined between the tilting sections 6c of the wire saddle 6, has a dimension smaller than an outer diameter of the optical cable 5.

An operation will be explained hereafter.

Initially, plural unit-mounting frames 2 are mounted in the rack 3 from the front as to be stacked in multi-layers and accordingly the unit 1 is mounted on each of the unit-mounting frames 2. Next, the optical cables 5, which are tied in a bundle and supplied from above or beneath along rear and side faces of the rack 3, is installed onto the cable supporting section 4a of the unit 4 which is mounted on a rear face of the unit-mounting frames 2. On performing the installation of the optical cable, the wire saddles 6 are so fixed in the mounting hole 4c of the cable supporting section 4a that all of them are arranged on a circle. The remainder 5a of the loop-shaped optical cable 5 is held on the wire saddles 6 arranged on the circle. In this case, the optical cable 5 is pressed downwardly against ends of the tilting sections 6c in the gap 6e while the optical cable 5 is sliding on upper faces of the tilting sections 6c. At this time, the tilting sections 6c are further bent downwardly due to elastic deformation of the tilting section 6c with respect to the wall section 6b. In this way, the gap 6e, which is defined between the tilting sections 6c, is spread briefly and becomes to have a dimension larger than the outer diameter of the optical cable 5. Therefore, the optical cable 5 is mounted in a space enclosed by the wire saddle 6. The gap 6e just after the optical cable 5 is passed through becomes to have a dimension smaller than the outer diameter of the optical cable 5 because the tilting sections 6c return to original positions, respectively. Therefore, even if the optical cable 5 floats in the air, the optical cable 5 is held in the space enclosed by the wire saddle 6. Moreover, the optical cables 5 held by the wire saddle 6 are connected to optical connectors (not shown) arranged in the telecommunications equipment of the unit 1, and then the optical cables 5 are fixed in a state of putting them in order.

Figure 4:
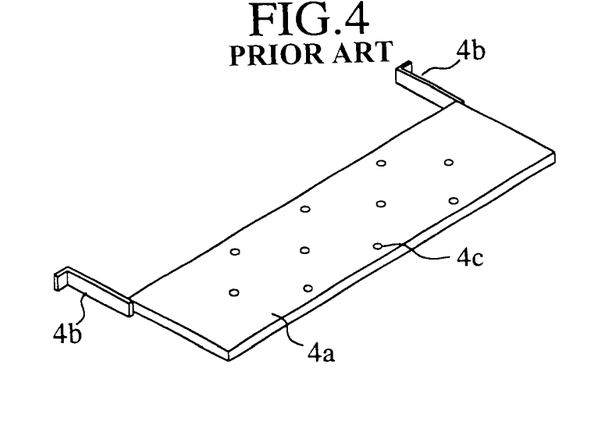
FIG. 4 is a perspective view of an alternative cable supporting section, which is used in the unit shown in FIG. 2.
Figure 5:
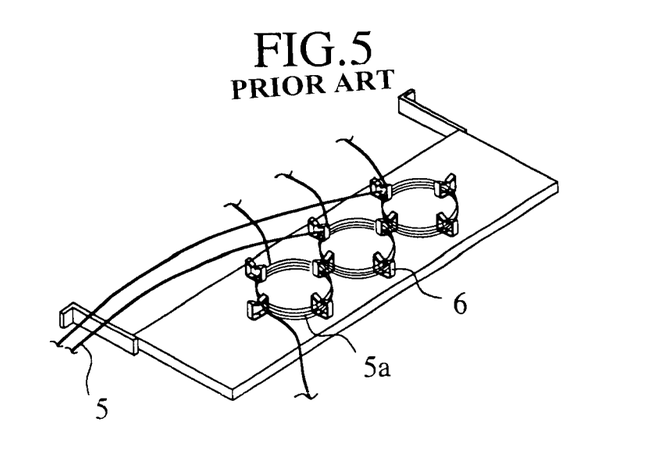
FIG. 5 is a perspective view of a state of holding the remainder of the optical cables using the wire saddle shown in FIG. 3 and the cable supporting section shown in FIG. 4.

FIG. 4 is a perspective view of an alternative cable supporting section, which is used in the unit shown in FIG. 2. FIG. 5 is a perspective view of a state of holding the remainder of the optical cables using the wire saddle shown in FIG. 3 and the cable supporting section shown in FIG. 4. As shown in FIG. 4 and FIG. 5, with the alternative, three rows of mounting holes 4c along the length of the cable supporting section 4a are formed at the cable supporting section 4a. The central row of the mounting holes 4c is shifted by one-half of travel between the mounting holes 4c in a longitudinal direction of the cable supporting section 4a with respect to the external rows of the mounting holes 4c. Therefore, two mounting holes 4c adjacent to each other in the central row and two mounting holes 4c in the external rows close to the two mounting holes 4c of the central row are used for handling the remainder 5a of one optical cable 5. Moreover, as shown in FIG. 5, in the central row of the mounting holes 4c, two mounting holes 4c adjacent to each other, except for both ends of the central row of the mounting holes 4c, are used for handling two optical cables 5.

The conventional unit for handling the remainder of the optical cables is however constructed as described above. Therefore, the optical connector (not shown) connected to the optical cable 5 handled using the unit 4 is close to the telecommunications equipment of the unit 1, and is apart from the unit 4. Accordingly, it is difficult to perform insertion and removal of the optical cable into and from the optical connector (not shown).

Moreover, with the conventional unit for handling the remainder of the optical cables, handling the remainder 5a of the optical cables 5 connected to the optical connector on setting up the rack 3 must perform after handling during in-plant fabrication of the unit. The complicated handling results in a poor-workability.

Further, with the conventional unit for handling the remainder of the optical cables, since numerous wire saddles 6 must be mounted on the unit, it takes much time to mount the wire saddles 6. Accordingly, there is a poor-workability problem.

SUMMARY OF THE INVENTION

The invention was made to solve the foregoing problems. Accordingly, it is an object of the invention to provide a unit for handling the remainder of optical cables improving the workability of connecting an optical cable to an optical connector, which is arranged in the device for mounting telecommunication equipment including transmission devices, the telephone switching devices and so on using the optical cables as a means of conveying intelligence, and improving the workability of handling the remainder of the optical cable.

A unit for handling the remainder of optical cables according to the invention, comprises: a cable supporting section holding the remainder of the optical cables; and a connector for interface, arranged at a central section of the cable supporting section to hold ends of the optical cables. In this way, when the optical cables are wired, the optical cables are connected simply to the optical connector arranged at the central section of the cable supporting section. Therefore, it is possible to facilitate check of positions where the optical cables are connected and that of insertion of the optical cables into the optical connector. It is further possible to improve the efficiency of workability during field installation of telecommunications equipment-mounting devices.

With the above arrangement, the cable supporting section may include: a first area for holding previously the remainder of one optical cable during in-plant fabrication; and a second area for holding the remainder of the other optical cable connecting through the connector for interface to an end of the one optical cable held by the first area during field installation of optical cables. In this way, when the remainder of the one optical cable is held previously on the first area during in-plant fabrication performed in advance of the field installation, it is possible to focus on handling the remainder of the specified optical cable on the field installation. As a result, it is possible to eliminate work-site errors, to improve the efficiency of workability and to reduce time for working. Since optical cables arranged during in-plant fabrication of the unit is not complicated with optical cables arranged during field installation, it is possible to facilitate work such as maintenance and so on.

With the above arrangement, at least one cable holder holding individually the remainder of the optical cables may be arranged at the first and second areas of the cable supporting section respectively, and the cable holder may include a wire saddle holding the remainder of the optical cables in being inserted into and passed through the wire saddle; and a cable guide ensuring the shortest bending radius of the optical cables. In this way, it is possible to ensure that the remainder of the optical cables is handled without increasing transmission loss of the optical cables.

With the above arrangement, the wire saddle may be integrated with the cable guide to constitute the cable holder. In this way, since there is no need to handle individually parts constituting the cable holder, it is possible to reduce time for assembling the cable supporting section including work of inserting the optical cables into the wire saddle and to bring down the cost of work.

With the above arrangement, it may further comprise a cover element jacketing the cable holder, wherein at least one part of the cover element is transparent. In this way, it is possible to check the interior of the cable holder through the transparent portion of the cover. Therefore, it is possible to prevent the transmission loss of the optical cables from increasing as a result of the optical cables, which should be wired, being pinched between the cable holder and the cover.

With the above arrangement, the cable holder may be stacked in multi-layers. In this way, it is possible to improve the efficiency of occupancy of the remainder of the optical cables.

We further provide a method for wiring optical cables by placing a unit for handling the remainder of the optical cables, by placing the unit in telecommunications equipment mounting device using the optical cables as a means of conveying intelligence and keeps hold of the remainder of the optical cables on a horizontal face, comprising the steps of: constituting the unit including a cable supporting section holding the remainder of the optical cables; and a connector for interface, arranged on the cable supporting section to hold ends of the optical cables; constituting the cable supporting section including: a first area for holding previously the remainder of one optical cable during in-plant fabrication of the unit; and a second area for holding the remainder of the other optical cable connecting through the connector for interface to an end of the one optical cable held by the first area during field installation of optical cables; handling the remainder of the optical cables in the first area; and placing the unit handled in the previous step in the telecommunications equipment mounting device. In this way, it is possible to improve the efficiency of workability and the productivity of the telecommunications equipment-mounting device, as compared with the case of handling the remainder of the optical cables in the first area after placing the unit for handling the remainder of the optical cables in the telecommunications equipment-mounting device.

BEST MODES FOR CARRYING OUT THE INVENTION

To explain the invention more in detail, the best modes of carrying out the invention will be described with reference to the accompanying drawings.

Embodiment 1

Figure 6:
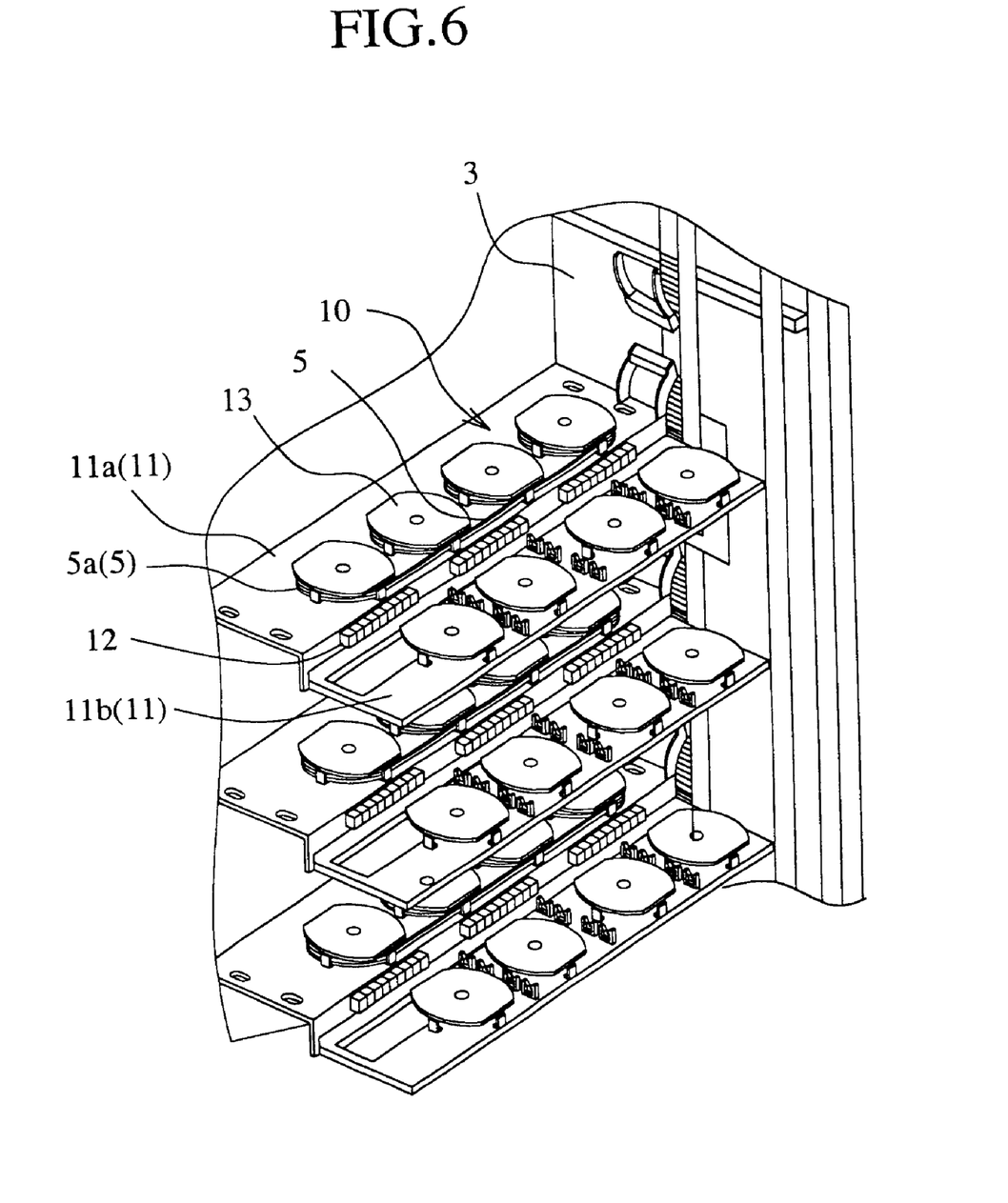
FIG. 6 is a perspective view of a state of arranging a unit for handling the remainder of optical cables as embodiment 1 according to the invention in a telecommunications equipment-mounting device as to be stacked in multi-layers.
Figure 7:
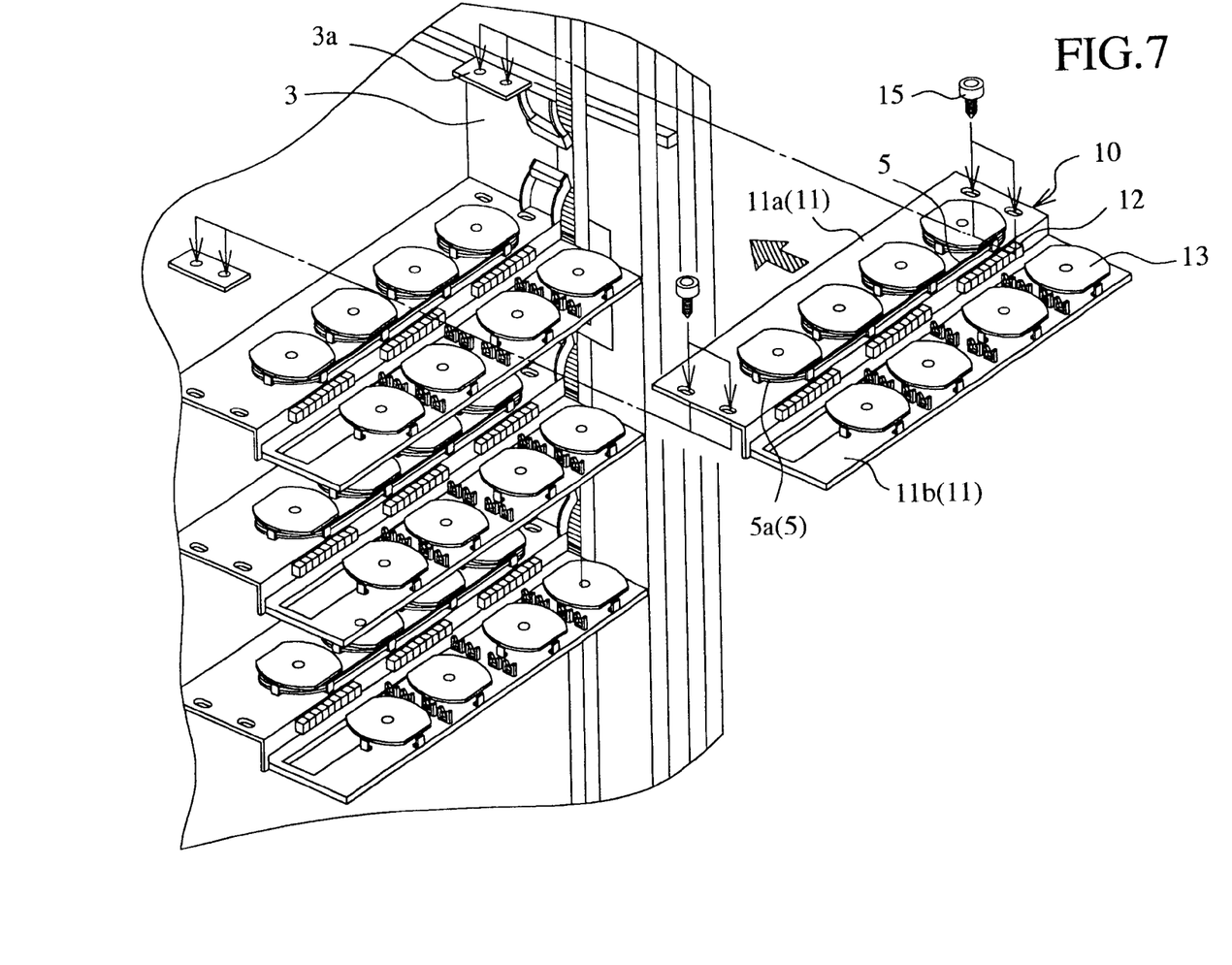
FIG. 7 is a perspective view of a state of placing the unit in the telecommunications equipment-mounting device shown in FIG. 6.
Figure 8:
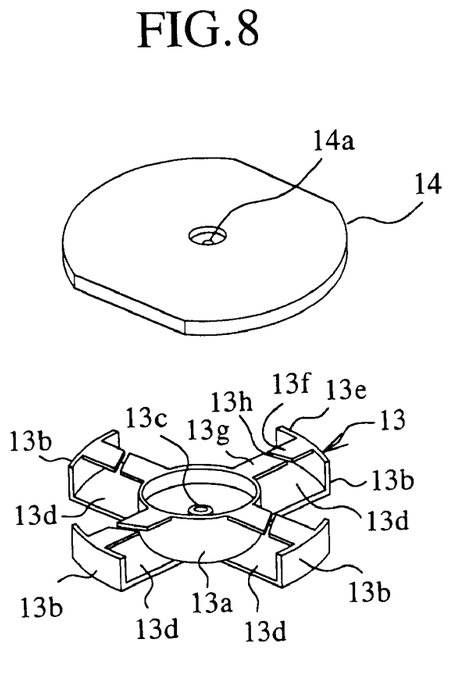
FIG. 8 is an exploded perspective view of construction of a cable holder and a cover used in the unit as embodiment 1 according to the invention.

FIG. 6 is a perspective view of a state of arranging a unit for handling the remainder of optical cables as embodiment 1 according to the invention in a telecommunications equipment-mounting device as to be stacked in multi-layers. FIG. 7 is a perspective view of a state of placing the unit in the telecommunications equipment-mounting device shown in FIG. 6. FIG. 8 is an exploded perspective view of construction of a cable holder and a cover used in the unit as embodiment 1 according to the invention. Components of the embodiment 1 common to those of the conventional units shown in FIG. 1 to FIG. 5 are denoted by the same reference numerals and further description will be omitted.

In the drawings, a reference numeral 10 denotes a unit for handling the remainder of optical cables. The unit 10 includes a cable supporting section 11 and an optical connector (connector for interface) 12 arranged at a central section of the cable supporting section 11. The cable supporting section 11 includes a first area 11a for holding previously the remainder 5a of the optical cables 5 during in-plant fabrication of the unit, and a second area 11b for holding the remainder of the other optical cable connecting through the connector for interface to an end of the one optical cable held by the first area 11a during field installation of optical cables. Each of the first area 11a and the second area 11b is a board having a rectangular shape, and a plurality of optical connectors 12 are arranged at a boundary between both areas. The first area 11a is located at the back of the rack 3, and the second area 11b is located at the front of the rack 3. Moreover, the first area 11a is located at a position, which is slightly higher than the second area 11b.

A plurality (with the embodiment 1, four) of cable holders 13 are arranged at the first area 11a and the second area 11b of the cable supporting section 11. As shown in FIG. 8, the cable holder 13 includes a central cylinder 13a located at a central section of the cable holder 13 and functioning as a hub, and a cable holding section 13b extending from the central cylinder 13a in all directions. A mounting hole 13c is formed at the bottom of the central cylinder 13a and allows insertion of a screw (not shown), which is used for fixing the cable holder 13 on the cable supporting section 11. The cable holding section 13b includes radial sections 13d each extending outwardly from the bottom of the central cylinder 13a in the radial direction, standing-up sections 13e each extending upwardly from a front end of each radial section 13d, first tabs 13f each extending from a front end of each standing-up section 13e toward an upper section of the central cylinder 13a, and second tabs 13g each extending outwardly from the upper section of the central cylinder 13a in the radial direction as to face the first tabs 13f. Gaps 13h are formed between the first tabs 13f and the second tabs 13g and have the same dimension as the outer diameter of the optical cable 5. Each gap 13h is cut in a direction (slanting direction) of intersecting a circumference or tangent of the remainder 5a of the loop-shaped optical cables 5 mounted on the central cylinder 13a. The cable holder 13 is formed in one piece of materials such as ABS resins, for example.

An all-transparent cover 14 is mounted on the upper section of the cable holder 13. A projection (not shown) is formed at a lower section of the cover 14 and engages with upper and outer sections of the standing-up sections 13e of the cable holder 13. Moreover, amounting hole 14a is arranged at a central section of the cover 14 and holds the cover 14 to the cable holder 13 as to align the mounting hole 14a in the mounting hole 13c of the cable holder 13.

Such a unit 10 is mounted on the mounting section 3a of the rack 3 using a screw 15 as shown in FIG. 7.

An operation will be explained hereafter.

Initially, the remainder of the optical cables is held previously on the first area 11a of the cable supporting section 11 of the unit 10 during in-plant fabrication. The remainder 5a of the optical cables 5, which will be connected through the connector 12 to an end of the optical cable (not shown) held on the first area 11a during field installation, is then held on the second area 11b during the field installation.

With work for handling the remainder, as shown in FIG. 8, the cable holder 13 is held on the cable supporting section 11 using the screw (not shown). The remainder 5a of the optical cables 5 is then inserted from the gaps 13h of the cable holding section 13b into the radial sections 13d. The insertion work is performed at each cable holding section 13b formed at a periphery of the central cylinder 13a in order to arrange the remainder 5a of the optical cables 5 at the periphery of the central cylinder 13a in a loop. Next, the cable holder 13 is covered with the cover 14. At this time, the projection (not shown) formed at the lower section of the cover 14 is engaged with the upper and outer section of the standing-up section 13e of the cable holder 13 to mount the cover 14 on the cable holder 13. Here, it is possible to check visually through the cover 14 that the remainder 5a of the optical cables 5 is not pinched between the cable holder 13 and the cover 14.

As described above, according to the embodiment 1, the optical connector 12 is arranged at the central section of the unit 10. In this way, it is possible to facilitate check of positions where the optical cables are connected and that of insertion of the optical cables into the optical connector 12.

With the embodiment, the cable supporting section 11 of the unit 10 is divided into the first area 11a for handling the remainder of optical cables during in-plant fabrication and the second area 11b for handling the remainder of optical cables during field installation. In this way, there is no need to perform two kinds of work for handling the remainder of optical cables with respect to an overlapped area. Further, it is possible to eliminate work-site errors, to improve the efficiency of workability and to reduce time for working. Since optical cables (not shown) arranged during in-plant fabrication of the unit is not complicated with optical cables 5 arranged during field installation, it is possible to facilitate work such as maintenance and so on.

With the embodiment 1, the cover 14 all is so formed as to be transparent. In this way, it is possible to check visually work-site errors such as a pinch of the optical cables 5 from outside through the cover 14. Therefore, it is possible to improve reliability with respect to work for handling the remainder of optical cables.

With the embodiment 1, the cover 14 all is so formed as to be transparent. Alternatively, there is no need to form the cover 14 all to be transparent, on condition that the cover 14 has a transparent part allowing a worker to check circumstances that the remainder 5a of the optical cables 5 handled by the cable holder 13 is pinched between the cable holder 13 and the cover 14.

Embodiment 2

Figure 9:
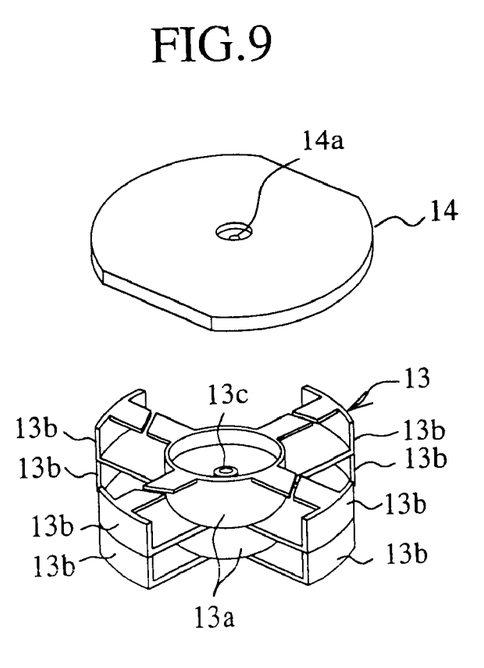
FIG. 9 is an exploded perspective view of a state of arranging the cable holder used in a unit for handling the remainder of optical cables as embodiment 2 according to the invention as to be stacked in multi-layers.

FIG. 9 is an exploded perspective view of a state of arranging the cable holder used in a unit for handling the remainder of optical cables as embodiment 2 according to the invention as to be stacked in multi-layers. Components of the embodiment 1 common to those of the embodiment 1 are denoted by the same reference numerals and further description will be omitted.

The embodiment 2 is characterized in that the cable holder 13 is so constructed as to be stacked in two layers. In other words, the central cylinder 13a of an upper-side cable holder 13 is mounted on the central cylinder 13a of a lower-side cable holder 13. Each radial section 13d of the upper-side cable holder 13 is mounted on each radial section 13d of the lower-side cable holder 13. Both mounting holes 13e are locked with one screw (not shown).

As described above, according to the embodiment 2, the cable holder 13 is so constructed as to be double-stacked. In this way, it is possible to improve the efficiency of occupancy of the remainder 5a of the optical cables 5.

Moreover, with the embodiment 2, the cable holder 13 is so constructed as to be stacked in two layers. Alternatively, the invention is not limited to the construction above, and the cable holder may be stacked in multi-layers.

Embodiment 3

Figure 10:
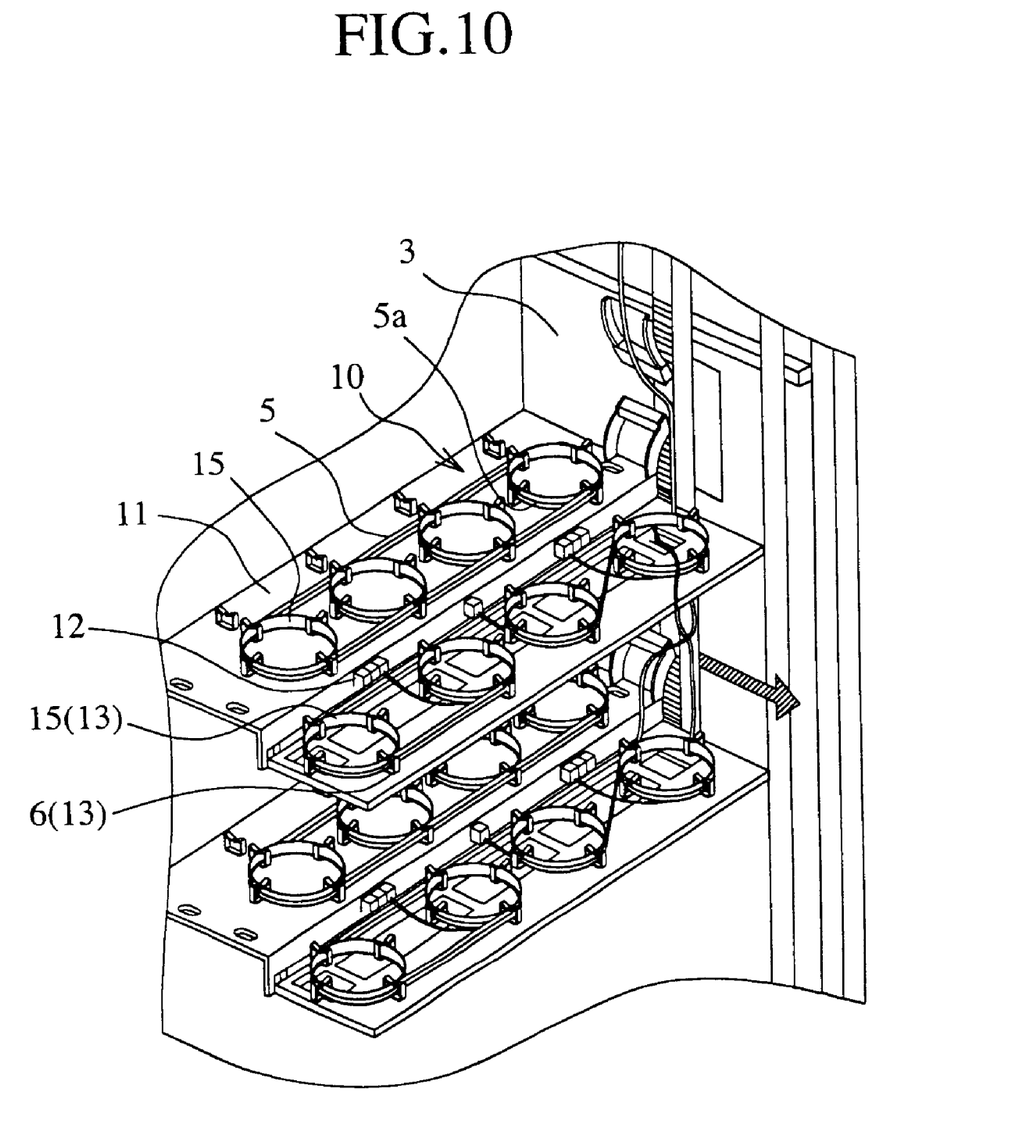
FIG. 10 is a perspective view of construction of a unit for handling the remainder of optical cables as embodiment 3 according to the invention.
Figure 11:
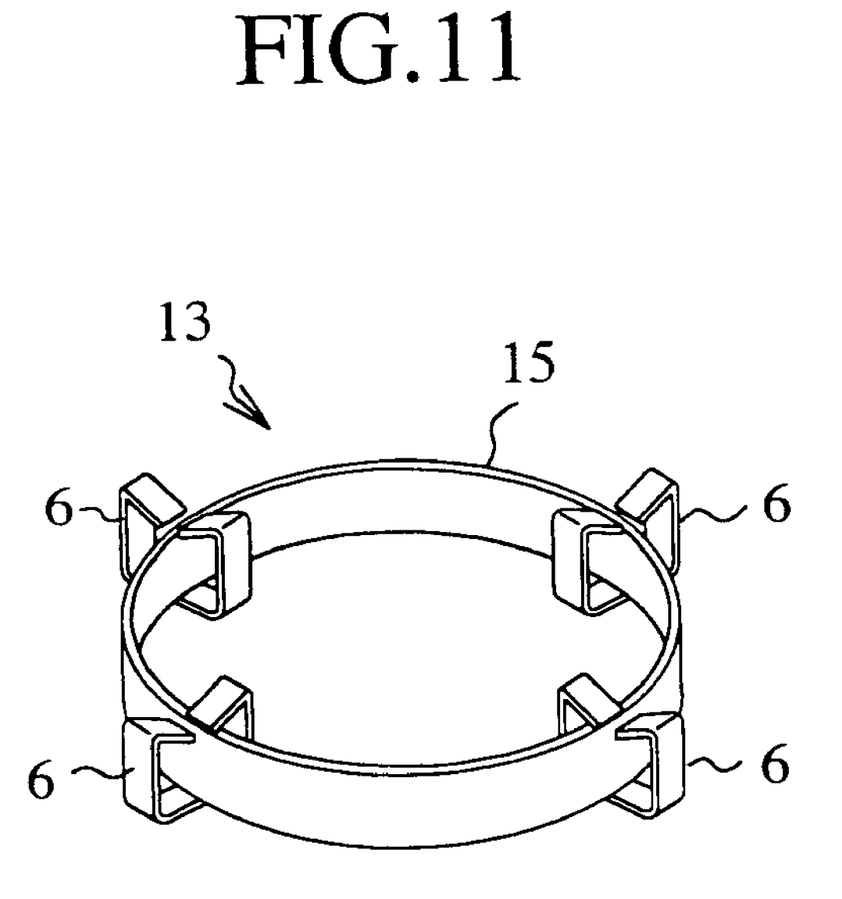
FIG. 11 is a perspective view of construction of a cable holder shown in FIG. 10.

FIG. 10 is a perspective view of construction of a unit for handling the remainder of optical cables as embodiment 3 according to the invention. FIG. 11 is a perspective view of construction of a cable holder shown in FIG. 10. Components of the embodiment 1 common to those of the embodiment 1 are denoted by the same reference numerals and further description will be omitted.

The embodiment 3 is characterized in that the cable holder 13 includes the wire saddles 6 and a cable guide 15. The wire saddles 6 are arranged on the circumference of a circle having the shortest bending radius of the remainder 5a of the optical cables 5 at regular intervals. The cable guide 15 is inserted into the wire saddles 6 and ensures the shortest bending radius of the remainder 5a of the optical cables 5.

As described above, according to the embodiment 3, the remainder 5a of the optical cables 5 is arranged at the periphery of the cable guide 15 in a loop, and the cable guide 15 is inserted into four wire saddles 6 through the gaps 6e arranged on the circumference of the circle. In this way, it is possible to simplify work for inserting the optical cables 5 into the wire saddles 6 and to improve the efficiency of workability of handling the remainder of optical cables.

INDUSTRIAL APPLICABILITY

As described above, the unit for handling the remainder of optical cables according to the invention is adequate for improving the workability of connecting an optical cable to an optical connector and of handling the remainder of the optical cable. The optical connect is arranged in the device for mounting the telecommunication equipment such as transmission devices, the telephone switching devices and so on, the telecommunications equipment mounting device using the optical cables as a means of conveying intelligence.

What is claimed is:

1. An optical cable excess handling unit, comprising:
   a first area including at least one cable holder configured to hold an excess portion of a first optical cable, said excess portion of the first optical cable being mounted to the cable holder of the first area during in-plant fabrication of the handling unit;
   a second area including at least one cable holder configured to hold an excess portion of a second optical cable, said excess portion of the second optical cable being mounted to the cable holder of the second area during on-site installation of the handling unit to an equipment rack including a first communication device; and
   an optical connector at a boundary between the first and second areas, said optical connector being disposed in parallel between center axes passing through the cable holders of the first and second areas.

2. The handling unit according to claim 1, wherein the first area is located at a position higher than the second area when the handling unit is assembled to the equipment rack.

3. The handling unit according to claim 1, wherein the cable holders of the first and second areas include a cover having at least a transparent portion.

4. The handling unit according to claim 1, wherein the cable holders of the first and second areas include a plurality of stacked cable holders.

5. The handling unit according to claim 1, wherein the cable holders of the first and second areas include wire saddles arranged in a loop at regular intervals and a cable guide inserted into a respective wire saddle to ensure a respective optical cable is guided around the wire saddle with a shortest bending radius of the respective optical cable.

6. The handling unit according to claim 1, wherein a first end of the first optical cable is mounted into a communication port of the first communication device, a second end of the first optical cable is mounted into a first side of the optical connector, a first end of the second optical cable is mounted into a second side of the optical connector, and a second end of the second optical cable is mounted to a second communication device such the first and second communication devices communicate with each other through the first and second optical cables.

7. A method of handling optical cables, comprising:
   installing an optical cable excess handling unit into an equipment rack including a first communication device, said optical handling unit including,
   a first area having at least one cable holder configured to hold an excess portion of a first optical cable, said excess portion of the first optical cable being mounted to the cable holder of the first area during in-plant fabrication of the handling unit,
   a second area having at least one cable holder configured to hold an excess portion of a second optical cable, said excess portion of the second optical cable being mounted to the cable holder of the second area during on-site installation of the handling unit to the equipment rack, and
   an optical connector at a boundary between the first and second areas, said optical connector being disposed in parallel between center axes passing through the cable holders of the first and second areas;

installing a first end of the first optical cable to a communication port of the first communication device installed in the equipment rack;

installing a first end of the second optical cable to the optical connector; and installing a second end of the second optical cable to a second communication device so the first and second communication devices communicate with each other through the first and second optical cables.

8. The method according to claim 7, further comprising:

installing a second end of the first optical cable to the optical connector.

9. The method according to claim 7, wherein the first area is located at a position higher than the second area when the handling unit is installed in the equipment rack.

10. The method according to claim 7, wherein the cable holders of the first and second areas include a cover having at least a transparent portion.

11. The method according to claim 7, wherein the cable holders of the first and second areas include a plurality of stacked cable holders.

12. The method according to claim 7, wherein the cable holders of the first and second areas include wire saddles arranged in a loop at regular intervals and a cable guide inserted into a respective wire saddle to ensure a respective optical cable is guided around the wire saddle with a shortest bending radius of the respective optical cable.

13. An optical cable excess handling unit mounted to an equipment rack for a communication device, comprising:

a cable supporter including a first area and a second area in which an excess portion of a first optical cable is processed in the first area and an excess portion of a second optical cable is processed in the second area; and an interface connector through which the first optical cable is connected to the second optical cable, wherein the first area mounted to the a first side of the equipment rack has a first cable holder for holding an excess portion of the first optical fiber, the second area mounted to a second side of the equipment rack has a second cable holder for holding an excess portion of the second optical fiber, a height of the first area is different from a height of the second area at a boundary area, and the interface connector is mounted to the boundary area.

* * * * *